United States Patent
Langewiesche

(10) Patent No.: US 9,494,179 B2
(45) Date of Patent: Nov. 15, 2016

(54) SCHRAUBELEMENT—SCREW ELEMENT

(71) Applicant: SPAX International GmbH & Co. KG, Ennepetal (DE)

(72) Inventor: Frank Langewiesche, Sprockhövel (DE)

(73) Assignee: SPAX INTERNATIONAL GMBH & CO. KG, Ennepetal (DE)

( * ) Notice: Subject to any disclaimer, the term of this patent is extended or adjusted under 35 U.S.C. 154(b) by 1 day.

(21) Appl. No.: 14/272,157

(22) Filed: May 7, 2014

(65) Prior Publication Data
US 2015/0322990 A1 Nov. 12, 2015

(30) Foreign Application Priority Data
May 24, 2013 (EP) ..................................... 13169134

(51) Int. Cl.
F16B 25/02 (2006.01)
F16B 25/00 (2006.01)
F16B 25/10 (2006.01)

(52) U.S. Cl.
CPC ....... F16B 25/0078 (2013.01); F16B 25/0015 (2013.01); F16B 25/106 (2013.01)

(58) Field of Classification Search
CPC ................ F16B 25/103; F16B 25/0015; F16B 25/10; F16B 25/106; F16B 35/041; F16B 35/042
USPC ..................................... 411/411, 386–387.8
See application file for complete search history.

(56) References Cited

U.S. PATENT DOCUMENTS

| 684,774 | A | * | 10/1901 | Baggs | 411/386 |
| 4,874,278 | A | * | 10/1989 | Kawashita | 411/386 |
| 6,595,733 | B1 | * | 7/2003 | Willert | 411/311 |
| 7,677,854 | B2 | * | 3/2010 | Langewiesche | 411/387.2 |
| 8,348,573 | B2 | * | 1/2013 | Chang | 411/387.1 |
| D696,103 | S | * | 12/2013 | Hsu | D8/387 |
| 2009/0028665 | A1 | * | 1/2009 | Chang | 411/387.3 |
| 2009/0110515 | A1 | | 4/2009 | Chen | |
| 2010/0129175 | A1 | * | 5/2010 | Wunderlich | F16B 25/0015 411/387.2 |

(Continued)

FOREIGN PATENT DOCUMENTS

| DE | 20 2007 011 292 U1 | 12/2007 |
| DE | 20 2010 005 255 U1 | 9/2010 |

(Continued)

*Primary Examiner* — Flemming Saether
(74) *Attorney, Agent, or Firm* — Brinks Gilson & Lione

(57) ABSTRACT

A screw element (1), having a threaded shank (2) and a screw tip (4), on one shank end, and a screw head (5) on the opposite end with force-application means (7), and a screw thread (12) on the threaded shank (2) and the screw tip (4). The screw tip (4), has a front first tip portion (4a), which tapers towards the end of the screw element, and a second adjacent tip portion (4b), having, a polygonal cross section, with an enveloping circle diameter ($d_h$) larger than a core diameter ($d_k$) of the first tip portion (4a). On the transition between the first and the second tip portions 4a,4b at least one end edge face is radially oriented in the diameter enlargement and terminates in a vertex (15) of the polygonal cross section, which lies on the enveloping circle of the second tip portion (4b).

17 Claims, 6 Drawing Sheets

(56) References Cited

U.S. PATENT DOCUMENTS

2014/0286728 A1* 9/2014 Park .............................. 411/411

FOREIGN PATENT DOCUMENTS

| | | |
|---|---|---|
| DE | 20 2010 010 250 U1 | 1/2011 |
| EP | 0 869 287 A1 | 10/1998 |
| EP | 1 411 252 A2 | 4/2004 |
| JP | S56-124309 U | 2/1955 |
| JP | 2013-36562 | 2/2013 |
| JP | S63-128308 | 8/2013 |

* cited by examiner

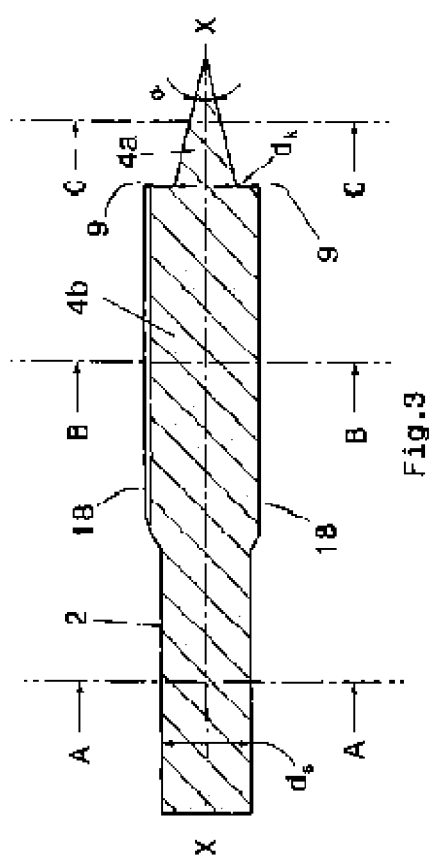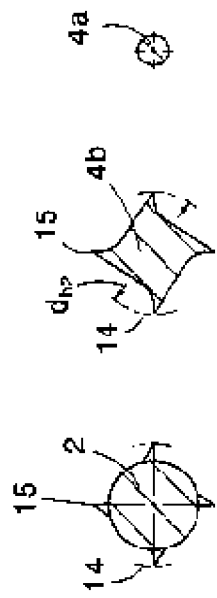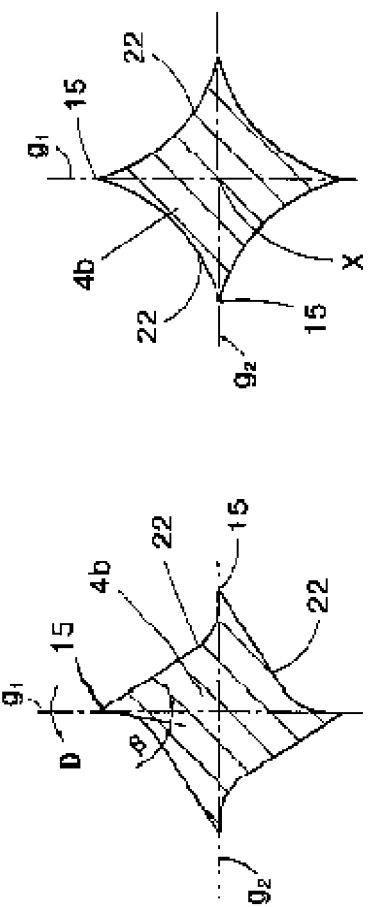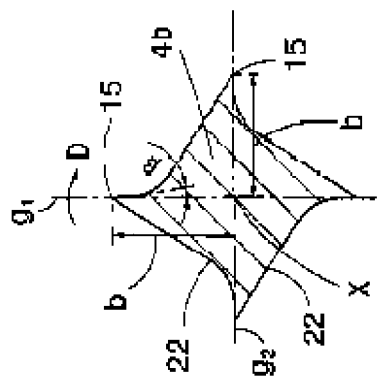

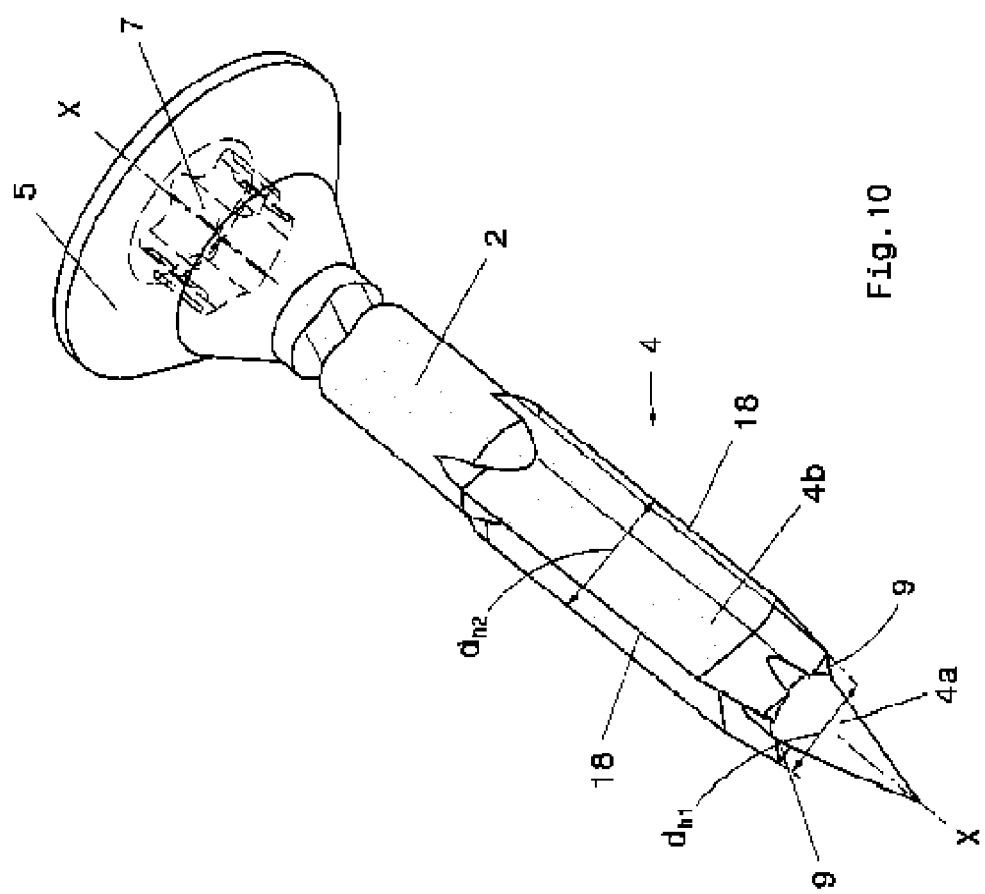

… (1)

SCHRAUBELEMENT—SCREW ELEMENT

CROSS REFERENCE TO RELATED APPLICATION

This application claims priority to European Patent Application No. 13169134.7 filed May 24, 2013.

FIELD OF THE INVENTION

The present invention relates to a screw element for fastening into a variety of materials.

BACKGROUND

A screw element of the generic type is disclosed in EP 0 869 287 B1. A screw element of this type serves, in particular, for screwing into the widest variety of materials, such as wood or plastic, and specifically without prior pre-drilling of a core hole. The screw element is directly screwed into the respective material, wherein a displacement effect is achieved in that the material is initially penetrated by the threaded tip. The thread, which runs up to the front end, when viewed in the screw-in direction, acts as a gripping tip, in order to achieve good engagement and penetration by the screw element with low axial compression, that is to say, mainly by way of rotation alone. In the known screw element, the region having the polygonal core cross section should extend in each case up to the terminal front end of the threaded tip. Moreover, the polygonal core cross section should have side surfaces which are curved in a convex manner, and corners which may likewise be rounded. The corners of the polygon lie on an enveloping circle of which the diameter may be smaller than/equal to, but in particular also equal to, the diameter of the cylindrical shank core of the threaded shank. It is to be achieved here by the known connection element that chip formation is largely avoided when screwing-in, in that the self-tapping effect of the connection element is based on the threaded tip, on account of its polygonal core cross section, pressing itself into the material, a radial displacement effect being achieved by a torque moment which rises and ebbs during rotation.

In the case of this known screw element, however, in particular when screwing into hardwood, splitting arises on account of the displacement effect of the screw tip which is polygonal in its cross section. In addition, a comparatively high axial force is necessary during initial screwing-in for the screw tip, having the thread, to grip.

The present invention is based on the object of further improving a screw element of the generic type with respect to its properties, in order to, in particular, largely avoid splitting and to further reduce the axial forces for screwing-in.

SUMMARY AND INTRODUCTORY DESCRIPTION OF THE INVENTION

The above object is achieved according to the invention by the features described herein. By connectively combining, when viewed in the screw-in direction, the front tip portion which tapers off, having adjacent thereto the radially oriented end face edge, which acts as a cutting edge and/or milling edge, with the polygonal tip portion adjacent to the front portion and with continuous running of the screw thread from the front first tip portion to the second tip portion, adjacent thereto, of the screw tip, easy penetration by the screw is enabled, on the one hand, and the continuously running thread, on the other hand, grips immediately upon penetration by the front conical region, and the application of force, which is not interrupted and is axial through the thread, supports the cutting effect of the radially oriented end face edge of the polygonal portion and thus enables easy further penetration by the screw element according to the invention into the respective material. On account of the design of the front conically running portion with a maximum diameter which is smaller than the enveloping circle diameter of the polygonal portion adjacent thereto, easy penetration into the respective material is enabled.

On account thereof, the splitting effect is also significantly reduced. According to the invention, it is of advantage for the front tip portion which tapers off to be configured as a pointed cone and to have a cone angle of 10° to 40°, in particular 20°. Here, it is expedient for the part-length of the conical front tip portion to be in a range of 0.8 to 2.0 times the thread lead of the screw thread of the screw element according to the invention. On account of the small cone angle and the diameter which is reduced in comparison with the diameter of the screw shank, the design according to the invention of the conical portion of the threaded tip supports easy penetration of the screw element according to the invention into the respective material. The polygonal tip portion which is adjacent to the conical portion preferably has an enveloping circle diameter which is larger than/equal to a maximum core diameter of the threaded shank which, in the cross section, is circular. On account thereof it is achieved that, on account of the core edges which are configured on the polygonal tip portion and which preferably run parallel to the central longitudinal axis, the screw hole produced, when viewed in the screw-in direction, by the front end face edge acting as a cutting edge cannot constrict itself again as a result of the resilience of the respective material into which the screw element according to the invention is screwed. The potentially resilient material is radially displaced or removed by the formed core edges, respectively, so that the screw shank which is adjacent to the polygonal tip portion can penetrate without great resistance into the drill hole produced by the screw tip.

BRIEF DESCRIPTION OF THE DRAWINGS

Advantageous embodiments are described in more detail by means of the exemplary embodiments illustrated in the following drawings, in which:

FIG. 3 shows a longitudinal section through the screw element of FIG. 2, but without screw head, FIGS. 3A, 3B, and 3C show sectional views according to the cut lines A-A, B-B and C-C respectively in FIG. 3, FIGS. 4, 5, and 6 show sections through alternative embodiments of the polygonal tip portion of the screw element according to the invention, FIG. 10 shows a perspective view of the screw element according to the invention, according to FIG. 9, but without screw thread.

In the various figures of the drawing, the same parts are always provided with the same reference signs.

FURTHER DESCRIPTION OF THE INVENTION

Figure 1:
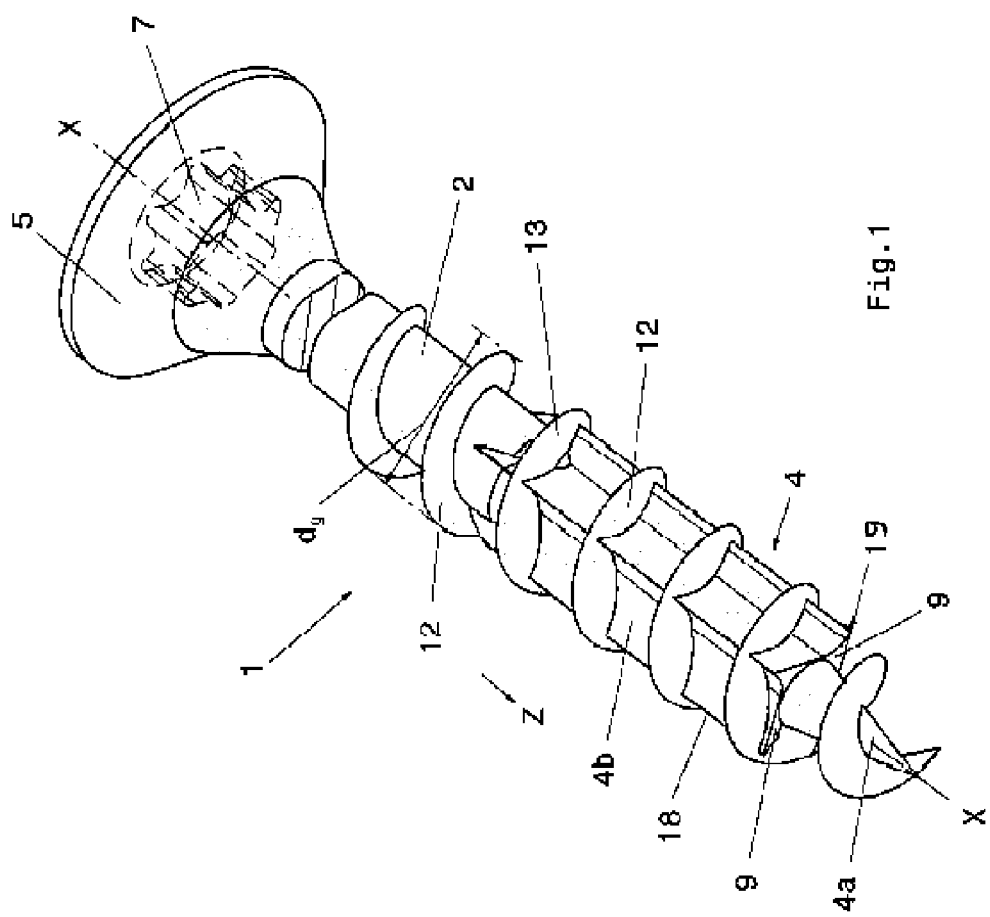
FIG. 1 shows a perspective view of a screw element according to the invention.

In the context of the following description it is claimed that the invention is not limited to the exemplary embodiments and thereby not to all or a plurality of features of described combinations of features; far rather, each individual sub-feature of the/of each exemplary embodiment is significant in its own right to the subject matter of the invention, also separately from all other sub-features mentioned in context thereto and also in combination with any features of another exemplary embodiment.

As is illustrated in the figures, a screw element 1 according to the invention includes a threaded shank 2 and a screw tip 4 which is configured on one end of the former, and a screw head 5 which is on an end which is opposite to the screw tip 4 and which has a force application means 7 for a screwing tool. The screw head 5 may be configured as, for example, a countersunk head, a round head or a flat head. The screw head 5 may also be shaped as a cylindrical extension of the threaded shank 2. The force application means 7 may be configured as a slot, a cross slot or as a socket force application means, for example in the form of a hexagonal socket or of a star socket or also, for example, as a hexagonal head on the screw head 5.

Figure 7:
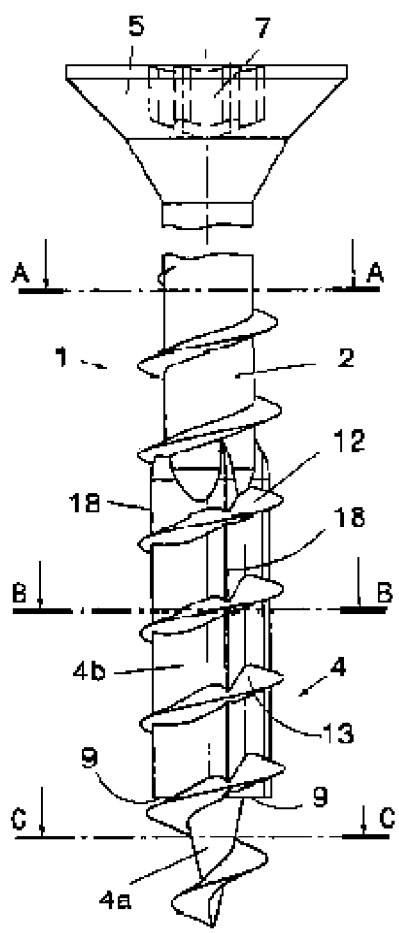
FIG. 7 shows a side view of the screw element according to the invention, shown in FIG. 1, FIGS. 7A, 7B, and 7C show sections through the screw element according to the invention, according to FIG. 7, along the cut lines A-A, B-B and C-C respectively.
Figure 8:
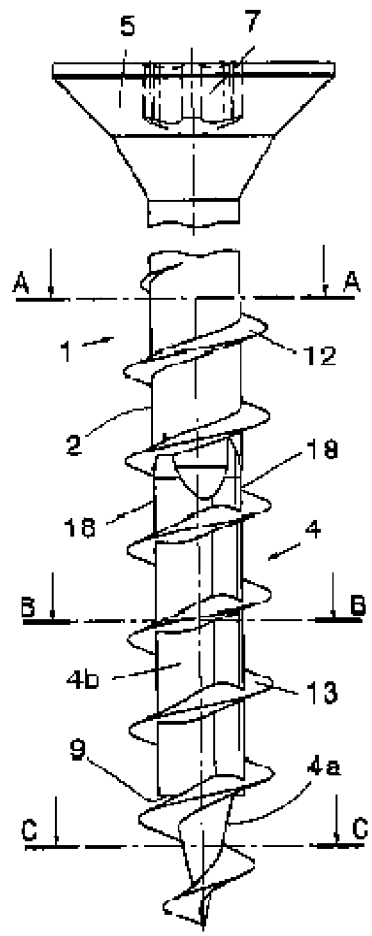
FIG. 8 shows a side view of the screw element according to FIG. 7, but in a position which is rotated by 45° in relation to the position in FIG. 7, FIGS. 8A, 8B, and 8C show sectional illustrations along the cut lines A-A, B-B and C-C respectively in FIG. 8.
Figure 7A:
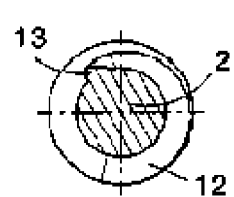
Figure 8A:
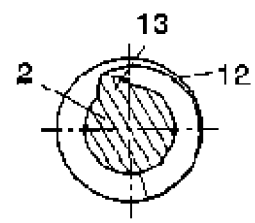
Figure 7B:
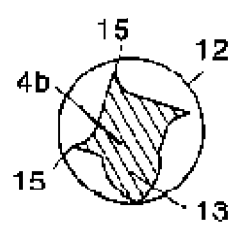
Figure 8B:
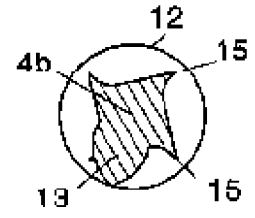
Figure 7C:
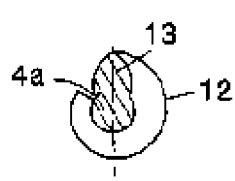
Figure 8C:
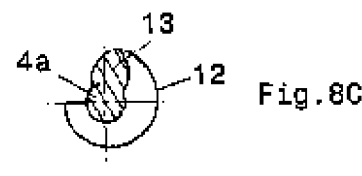

A screw thread 12 runs on the threaded shank 2 and on the screw tip 4. The thread is preferably formed by a thread turn 13 which runs in a helical shape and which, in the cross section, is configured to be triangular, for example, as shown in FIGS. 7, and 8. It is also within the scope of the invention for the thread 12 according to the invention to be configured as a multi-turn thread, for example consisting of two thread turns which are of helical shape and arranged in a circumferentially offset manner.

The screw thread 12 according to the invention is advantageously configured as a self-tapping or self-forming thread, respectively. The thread 12 according to the invention may have a constant thread lead, or else a variable thread lead, over the entire thread region. The thread 12 according to the invention has a maximum thread diameter $d_g$, i.e. the nominal diameter of the screw element according to the invention, which, in the illustrated exemplary embodiment, is constant in the region of the threaded shank, so that no change in the thread diameter is present in this region. The thread lead of the screw thread according to the invention is preferably 40% to 70% of the nominal diameter $d_g$ of the screw thread according to the invention, and specifically in relation to a single-turn thread.

Figure 2:
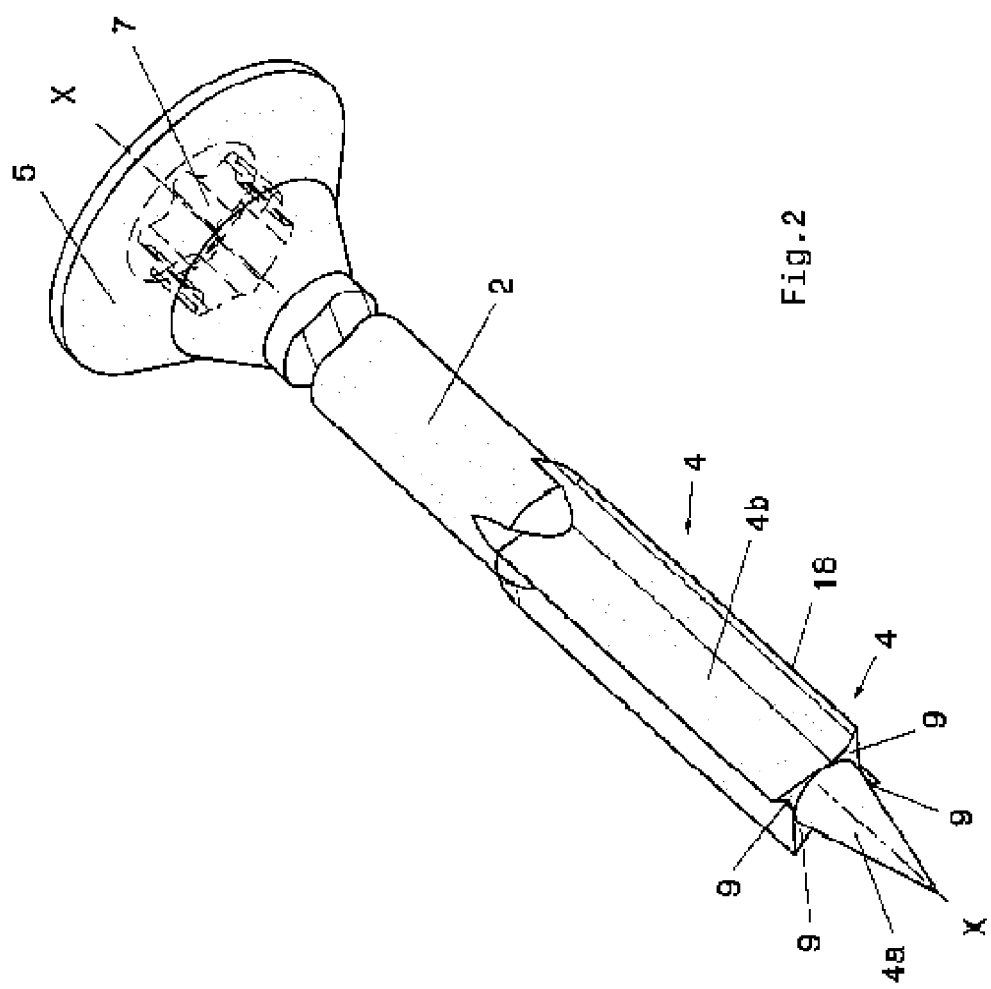
FIG. 2 shows a perspective view of the screw element according to FIG. 1, but without screw thread.

According to the invention, the screw tip 4 is composed of two tip portions 4a and 4b, and specifically, when viewed in the screw-in direction Z, of the front first tip portion 4a which tapers off towards the end of the screw element, and of the second tip portion 4b, which is adjacent to said first tip portion 4a. The tip portion 4b, when viewed in the cross section perpendicular to a central longitudinal axis X-X, has a polygonal cross section of its core having an enveloping circle 14 having a diameter $d_{h1}$, which runs through its polygon corners, see FIG. 3B. The first tip portion 4a is preferably configured as a pointed cone, as illustrated in FIG. 1, wherein its cone angle α may be 10° to 40°, in particular 20°, as shown in FIG. 3. The conical first tip portion 4a, in relation to the central longitudinal axis X-X, has a perpendicularly running circular cross section. The screw thread 12 runs over the entire threaded tip 4, wherein its radial thread height decreases to zero up to the end of the conical portion 4a. In the region of the second tip portion 4b which is of polygonal cross-sectional shape, the thread 12 preferably runs at a constant thread height, so that, also in the region of the tip portion 4b, the thread 12 has the nominal thread diameter $d_g$, as in the region of the threaded shank 2. The enveloping circle 14 of the polygonal tip portion 4b is larger than the core diameter $d_k$ of the screw core in the region of the tip portion 4a, as shown in FIG. 3. According to the invention, on the transition between the first tip portion 4a and the second tip portion 4b, at least one end edge face 9 which, in relation to the longitudinal centre axis X-X, is radially oriented, specifically in the sense of a diameter enlargement, and which terminates in a vertex 15 of the polygonal cross section, which lies on the enveloping circle of the second tip portion 4b, is present. This radially running end edge face 9 forms a type of cutting edge or milling edge, respectively. In the illustrated exemplary embodiment, the polygonal cross section of the second tip portion 4b has four vertices 15, so that the four end edge faces 9 are configured, specifically in relation to the circumference of the screw element 1 according to the invention, as shown in FIG. 2. As can be seen in particular in FIG. 1, the screw thread 12 runs without interruption over the first and second tip portions 4a, 4b, so that the screw thread 12 is also configured in the region of the end face edges 9. In FIG. 2, in which only the screw core of the screw element 1 according to the invention is illustrated, specifically the screw core in the region of the threaded shank 2 and in the region of the threaded tip 4, the configuration of the end face edge 9 is clearly visible in the transition from the first tip portion 4a to the second tip portion 4b. Here, the end face edges 9 run radially in relation to the longitudinal axis X-X. The enveloping circle of the second tip portion 4b advantageously has a diameter $d_h$ which is larger than/equal to a maximum core diameter $d_s$ of the threaded shank 2 which is circular in cross section. It is of advantage here for the enveloping circle diameter of the second tip portion 4b, which is polygonal in its cross section, to be constant over its axial length. As can be seen from the individual figures, the diameter of the pointed conical first threaded portion 4a, on its base face in the transition between the first and the second tip portions 4a, 4b, is smaller than the maximum core diameter $d_s$ of the threaded shank 2. It is furthermore provided according to the invention that the screw thread 12, in the region of the second tip portion 4b and likewise on the shank portion 2, has a larger outer diameter $d_g$ than the maximum enveloping circle diameter $d_h$ of the polygonal tip portion 4b.

In the illustrated exemplary embodiment, the thread 12 runs over the entire length of the threaded shank 2. It is likewise within the scope of the invention for the thread 12 not to run over the entire length of the threaded shank 2, but for there to be a thread-free shank portion to be configured, for example between the threaded portion of the threaded shank 2 and the screw head 5, such that only a part-thread is present on the threaded shank 2.

Furthermore, it may be of advantage, according to the invention, for the part-length of the first tip portion 4a to be in the range of a minimum of 0.8 times to a maximum of 2.0 times the lead s of the thread 12.

As can be seen in particular from FIGS. 3A, 3B, and 3C and 4 to 6, the second tip portion 4b, in its cross section, is configured in a polygonal manner such that it forms a quadrangle having four vertices 15. It is expedient here for the four vertices 15 to lie in each case on intersecting straight lines $g_1$, $g_2$, running orthogonally to the central longitudinal axis X-X, of the polygonal cross section, and in each case to be at the same distance b from the longitudinal axis X-X. It is expedient here, according to the invention, when viewed in the cross section, if the core sides 22 connecting the vertices 15 are configured so as to be concave, as can be seen, in particular, in FIG. 6. The core sides 22 may also run in a straight line. In the illustrated exemplary embodiments, a quadrangle is illustrated as the polygonal cross section of the tip portion 4b, but, likewise according to the invention, a triangular cross section or a cross section which has more than four corners may also be selected. It is preferred for a regular cross section to be configured. The vertices 15 of the individual cross sections, which lie behind one another in the longitudinal direction of the tip portion 4b, which is polygonal in its cross section, lie on straight lines which are parallel to the central longitudinal axis X-X, so that straight core edges 18 are formed and may thus have an additional milling effect, if a resilience of the material into which the screw element 1 according to the invention is screwed arises.

As is illustrated in FIG. 6, the polygonal quadrangular cross section of the tip portion 4b may in each case be configured to be symmetrically folding about the orthogonal straight lines $g_1$, $g_2$. A shape which deviates therefrom is illustrated in FIG. 4, wherein the core sides 22 and/or the core side faces of the entire portion resultant therefrom are configured in such a manner that an asymmetry results in relation to the orthogonal straight lines $g_1$, $g_2$. A design is shown in FIG. 4, in which the side portions or face portions, respectively, which point towards the turning direction and which originate from the respective vertex 15 and/or the core edges 18, run radially steep in the direction towards the longitudinal axis X-X in such a manner that they enclose an acute angle $\beta < 20°$ with the respective straight line running through the vertex 15 and, adjacent thereto, run in an almost straight line to that vertex 15 which follows in the turning direction. In FIG. 4, a shape of this type according to the invention for a clockwise turning direction D is illustrated, and in FIG. 5, a corresponding shape with the turning direction D being counter-clockwise is illustrated.

In FIGS. 3A, 3B, and 3C, a polygonal cross-sectional shape of the tip portion 4b, corresponding to FIG. 4, is illustrated. A corresponding cross-sectional shape of the polygonal tip portion 4b is also selected in FIGS. 7 and 8. On account of the configuration of the polygonal cross section according to FIGS. 4 and 5, an improved cutting effect and/or milling effect of the cutting edges 18 is achieved, which applies to the embodiment according to FIG. 4. In the embodiment according to FIG. 5, the effect is accordingly that in the case of a turning direction D, which is present when subjecting a screw according to the invention to rotation when loosening, loosening is met with a higher resistance.

Figure 9:
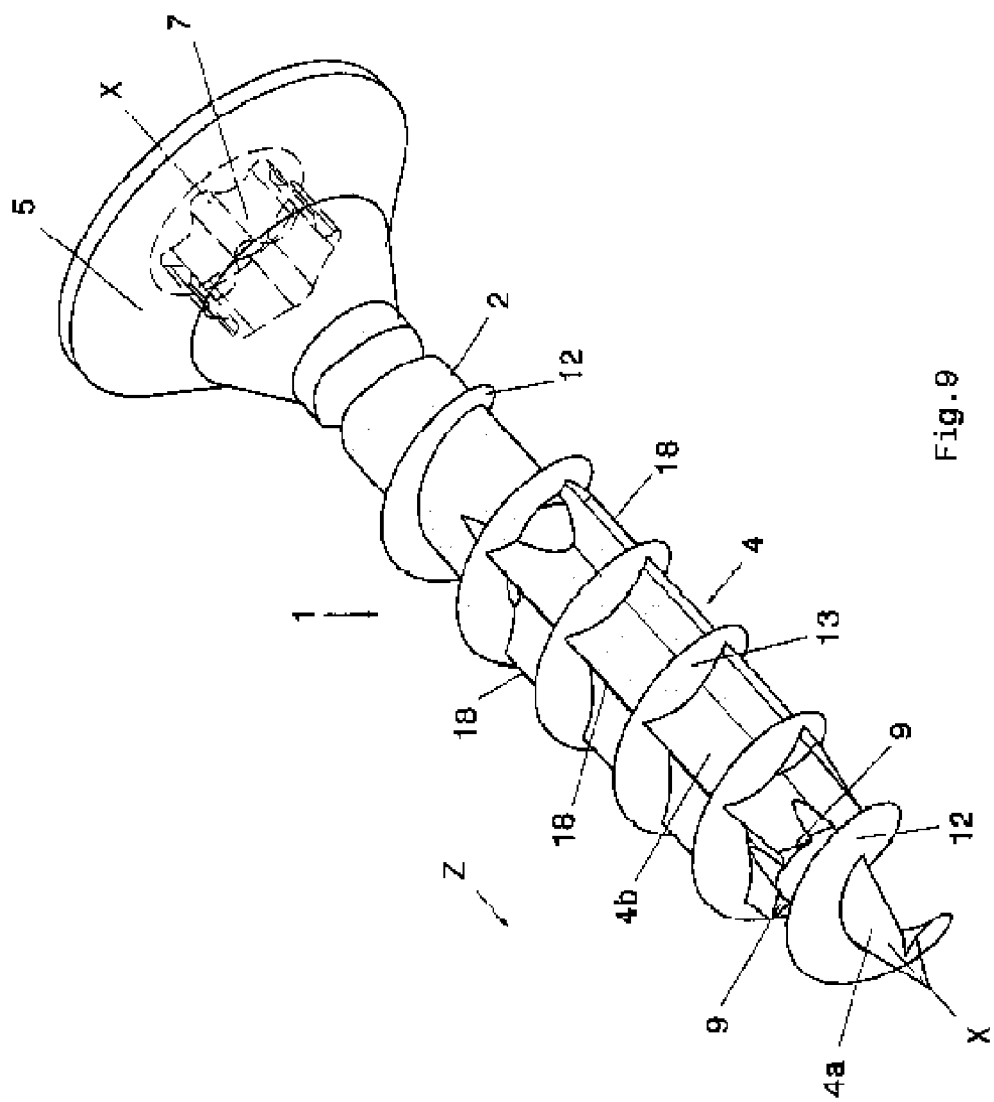
FIG. 9 shows a perspective view of a further embodiment of a screw element according to the invention.

In FIGS. 9 and 10 a design of a screw element 1 according to the invention, which substantially corresponds in a corresponding manner to the screw element 1 according to FIGS. 1 to 8 is illustrated, wherein, however, there is one difference in that the enveloping circle diameter $d_h$ of the enveloping circle 14 of the polygonal tip portion 4b is not constant and not of the same size over the entire length of the tip portion 4b, but that the enveloping circle diameter $d_h$, commencing with a diameter $d_{h1}$ in the region of the end edge faces 9, becomes larger, specifically preferably continuously larger, towards the threaded shank 2, up to the maximum enveloping circle diameter $d_{h2}$ in the remaining region of the polygonal tip portion 4b. Here, the length over which an increase of the enveloping circle diameter $d_h$ up to the maximum diameter takes place is preferably 10% to 50% of the entire length of the polygonal tip portion 4b. The difference in diameter between the enveloping circle diameter $d_{h1}$ in the region of the end face edge 9 and the maximum enveloping circle diameter $dh_2$ in the region of the polygonal tip portion 4b, in which a constant enveloping circle diameter $d_{h2}$ is present, is 5% to 20% of the maximum enveloping circle diameter $d_h$.

As illustrated in the individual figures, in the screw element 1 according to the invention the outer thread edge of the thread 12, in the region of the threaded shank 2 and also over the polygonal tip portion 4b, runs at a constant radius and a constant thread height. Over the region of the tip portion 4a in the shape of a truncated cone and up to the end of the same, the thread turn 13 runs helically and with a radius which continuously decreases to zero and with a decreasing thread height.

In one advantageous design which is not illustrated in the drawings, the thread edge of the thread 12, at least in the region of the threaded portion 4 and simultaneously in the region of the flank face of the thread, may moreover be configured in a wavelike manner such that a sequence of wave crests and wave troughs is present. Here, reference is made in full to document DE 3335092 A1.

The invention is not limited to the illustrated and described exemplary embodiments, but also includes all implementations having the same effect according to the concept of the invention. It is expressly emphasized that the exemplary embodiments are not limited to all features in combination with one another; far rather, each individual sub-feature in its own right, also separately from all other sub-features, may be of inventive significance.

While the above description constitutes the preferred embodiment of the present invention, it will be appreciated that the invention is susceptible to modification, variation and change without departing from the proper scope and fair meaning of the accompanying claims.

The invention claimed is:

1. A screw element, comprising a threaded shank and a screw tip, which is configured on a first end of the shank, and a screw head, which is configured on the opposite second end of the shank and having a force-application means, and having a screw thread which runs on the threaded shank and the screw tip, wherein the screw tip, when viewed in a screw-in direction, has a first tip portion which tapers off towards the first end of the screw element, and a second tip portion, which is adjacent to the first tip portion and having, when viewed in a cross section, a polygonal cross section shape, an enveloping circle of the cross section having a diameter larger than a core diameter of the first tip portion, the first tip portion having a circular cross section and, on a transition between the first tip portion and the second tip portion, the second tip portion has at least one end edge face, which faces the screw tip and which, in relation to a longitudinal center axis, is radially oriented outwardly with respect to the longitudinal center axis and perpendicular thereto, and which terminates in a vertex of the polygonal cross section, which lies on the enveloping circle of the second tip portion, and the screw thread is configured without interruption over the first and second tip portions of the screw tip, wherein the polygonal second tip portion has four vertices which lie on the enveloping circle of the polygonal tip portion and which intersect on two straight lines of the polygonal cross section which intersect orthogonally on the central longitudinal axis and wherein the four vertices are at the same distance from the longitudinal axis and are arranged on straight lines running parallel to the central longitudinal axis, such that straight core edges are formed with asymmetrically configured core sides connecting the vertices in such a manner that, in the screwing-in direction or the screwing-out direction of a screw element an increased cutting effect or milling effect is achieved.

2. The screw element according to claim 1, wherein the enveloping circle of the second tip portion has a diameter which is larger than or equal to a maximum core diameter of the threaded shank.

3. The screw element according to claim 1, wherein, over the axial length of the second tip portion, the diameter of the enveloping circle diameter of the second tip portion of the screw tip is constant.

4. The screw element according to claim 1, wherein the first tip portion is configured as a pointed cone having a cone angle in the range of 10° to 40°.

5. The screw element according to claim 4, wherein the first tip portion is configured as a pointed cone, on its base face on the transition between the first and second tip portions, is smaller than the maximum core diameter of the threaded shank.

6. The screw element according to claim 1, wherein the screw thread, in the region of the second tip portion and the shank portion, has an outer diameter which is larger than the maximum diameter of the enveloping circle in the region of the polygonal second tip portion.

7. The screw element according to claim 1, wherein the first tip portion has a part-length that is 0.8 to 2.0 times a maximum thread lead of the screw thread, wherein, in a one-start thread, the thread lead is 40% to 70% of the maximum thread diameter.

8. The screw element according to claim 1, wherein the thread outer diameter increases on the first tip portion, starting from the first end of the screw element, from 0 to a maximum thread outer diameter on the second tip portion.

9. The screw element according to claim 1, wherein the thread has an outer thread edge which, when viewed in the axial direction of the central longitudinal axis, runs helically and, in the region of the threaded shank and the second tip portion, runs at a constant radius and, over the first tip portion of the screw tip, runs helically, at a continuously decreasing radius.

10. The screw element according to claim 1, wherein the first tip portion is configured as a pointed cone having a cone angle of about 20°.

11. The screw element according to claim 1, wherein at the at least one end edge face, the core sides on one side of each of the core edges form an acute angle β<20° with the straight line extending through the core edge and through the longitudinal axis, and on an opposite side of each of the core edges, the core sides form an acute angle greater than β with the straight line extending through the core edge and the longitudinal axis.

12. A screw element comprising a threaded shank and a screw tip, which is configured on a first end of the shank, and a screw head, which is configured on the opposite second end of the shank and having a force-application means, and having a screw thread which runs on the threaded shank and the screw tip, wherein the screw tip, when viewed in a screw-in direction, has a first tip portion which tapers off towards the first end of the screw element, and a second tip portion, which is adjacent to the first tip portion and having, when viewed in a cross section, a polygonal cross section shape, an enveloping circle of the cross section having a diameter larger than a core diameter of the first tip portion, the first tip portion having a circular cross section and, on a transition between the first tip portion and the second tip portion, the second tip portion has at least one end edge face, which faces the screw tip and which, in relation to a longitudinal center axis, is radially oriented outwardly with respect to the longitudinal center axis and perpendicular thereto, and which terminates in a vertex of the polygonal cross section, which lies on the enveloping circle of the second tip portion, and the screw thread is configured without interruption over the first and second tip portions of the screw tip, wherein the second tip portion of the screw tip, on the transition from the first tip portion to the second tip portion, has a diameter of the enveloping circle which is smaller than the diameter of the enveloping circle in that end of the second tip portion which faces towards the threaded shank.

13. The screw element according to claim 12, wherein the polygonal cross section of the polygonal second tip portion has at least three vertices which lie on the enveloping circle of the polygonal tip portion.

14. The screw element according to claim 13, wherein the polygonal second tip portion has four vertices which intersect on two straight lines of the polygonal cross section which intersect orthogonally on the central longitudinal axis and in each case are at the same distance from the longitudinal axis.

15. The screw element according to claim 14, wherein the four vertices of the polygonal cross section of the polygonal tip portion are in each case arranged so as to lie behind one another in a circumferential direction on straight lines running parallel to the central longitudinal axis, such that straight core edges are formed.

16. The screw element according to claim 14 wherein the vertices of the polygonal cross section are connected by core sides which have a concave configuration in such a manner that the polygonal cross section, which, in relation to the straight lines running through the vertices, is in each case of a symmetrically folding configuration.

17. The screw element according to claim 14, wherein, in relation to the straight lines running through the vertices, the core sides which connect the vertices of the polygonal cross section are asymmetrically configured in such a manner that, in the screwing-in direction or the screwing-out direction of a screw element an increased cutting effect or milling effect is achieved.

* * * * *